(12) United States Patent
Kuboki et al.

(10) Patent No.: US 10,998,588 B2
(45) Date of Patent: May 4, 2021

(54) POWER STORAGE MODULE INCLUDING A COOLING MEMBER

(71) Applicants: AUTONETWORKS TECHNOLOGIES, LTD, Mie (JP); SUMITOMO WIRING SYSTEMS, LTD., Mie (JP); SUMITOMO ELECTRIC INDUSTRIES, LTD., Osaka (JP)

(72) Inventors: Hideyuki Kuboki, Mie (JP); Hiroki Hirai, Mie (JP); Makoto Higashikozono, Mie (JP); Akihisa Hosoe, Osaka (JP); Yoshiyuki Hirose, Osaka (JP); Akihiro Nagafuchi, Osaka (JP); Tomoharu Takeyama, Osaka (JP); Eiichi Kobayashi, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 97 days.

(21) Appl. No.: 16/322,276

(22) PCT Filed: Jul. 20, 2017

(86) PCT No.: PCT/JP2017/026200
§ 371 (c)(1),
(2) Date: Jan. 31, 2019

(87) PCT Pub. No.: WO2018/025645
PCT Pub. Date: Feb. 8, 2018

(65) Prior Publication Data
US 2019/0198950 A1    Jun. 27, 2019

(30) Foreign Application Priority Data

Aug. 3, 2016 (JP) ............................. JP2016-152695

(51) Int. Cl.
*H01M 10/613* (2014.01)
*H01M 10/625* (2014.01)
(Continued)

(52) U.S. Cl.
CPC .......... *H01M 10/613* (2015.04); *H01G 11/18* (2013.01); *H01M 10/625* (2015.04);
(Continued)

(58) Field of Classification Search
CPC ......... H01M 10/6567; H01M 10/6557; H01M 10/6569
See application file for complete search history.

(56) References Cited

U.S. PATENT DOCUMENTS

2007/0292751 A1    12/2007   Cherng et al.

FOREIGN PATENT DOCUMENTS

JP    2010-55908       3/2010
JP    2010-211963      9/2010
(Continued)

OTHER PUBLICATIONS

International Search Report in International Patent Application No. PCT/JP2017/026200, dated Sep. 5, 2017.

*Primary Examiner* — Maria Laios
*Assistant Examiner* — George Kim
(74) *Attorney, Agent, or Firm* — Greenblum & Bernstein, P.L.C.

(57) ABSTRACT

A power storage module includes a cooling member that has a coolant and a sealing body hermetically sealing the coolant; a power storage element that is stacked on the cooling members; and a heat transfer plate that is stacked on the
(Continued)

power storage elements with the cooling members therebetween. The sealing body is configured to form a bulging portion deformed by evaporation of the coolant in a region not overlapping the power storage element. The heat transfer plate has a folded portion with which the bulging portion is configured to abut.

6 Claims, 22 Drawing Sheets

(51) Int. Cl.
*H01M 10/647* (2014.01)
*H01M 10/6569* (2014.01)
*H01M 10/6552* (2014.01)
*H01M 10/6555* (2014.01)
*H01G 11/18* (2013.01)
*H01M 10/6557* (2014.01)
*H01M 50/20* (2021.01)
*H01M 10/6567* (2014.01)
*H01M 10/0525* (2010.01)

(52) U.S. Cl.
CPC ..... *H01M 10/647* (2015.04); *H01M 10/6552* (2015.04); *H01M 10/6555* (2015.04); *H01M 10/6557* (2015.04); *H01M 10/6567* (2015.04); *H01M 10/6569* (2015.04); *H01M 50/20* (2021.01); *H01M 10/0525* (2013.01); *H01M 2220/20* (2013.01)

(56) References Cited

FOREIGN PATENT DOCUMENTS

| JP | 2015-69845 | 4/2015 | | |
|----|------------|--------|---|---|
| JP | 2016178078 A | * | 10/2016 | ........... H01L 23/427 |

* cited by examiner

POWER STORAGE MODULE INCLUDING A COOLING MEMBER

TECHNICAL FIELD

The present description discloses a technique for dissipating heat from a power storage element.

BACKGROUND ART

There has been conventionally known a technique for dissipating heat from a power storage element. Patent Document 1 describes that a battery module is stored in a pack case and positive terminals and negative terminals of a plurality of cells are electrically connected together via bus bars. When a coolant charged in the lower portion of the pack case becomes evaporated and condensed in the upper portion of the pack case, heat of the battery is dissipated to the outside.

RELATED ART DOCUMENT

Patent Document

Patent Document 1: Japanese Unexamined Patent Application Publication No. 2010-211963

DISCLOSURE OF THE PRESENT INVENTION

Problem to be Solved by the Invention

According to the technique described in Patent Document 1, the coolant is to be evaporated and condensed in the pack case, and thus the entire pack case needs to be sealed. This causes a problem that it is not easy to simplify the configuration of the power storage module.

The technique disclosed herein is completed under the foregoing circumstances, and an object of the technique is to simplify the configuration of the power storage module.

Means for Solving the Problem

A power storage module described herein includes: a cooling member that has a coolant and a sealing body hermetically sealing the coolant; a power storage element that is stacked on the cooling member; and a heat transfer plate that is stacked on the power storage element with the cooling member therebetween. The sealing body is configured to form a bulging portion deformed by evaporation of the coolant in a region not overlapping the power storage element. The heat transfer plate has a folded portion with which the bulging portion is configured to abut.

According to the foregoing configuration, it is possible to dissipate heat from the power storage element via the cooling member in which the coolant is sealed in the sealing body and the heat transfer plate. Accordingly, as compared to the configuration in which the coolant is charged in a case where the power storage element is stored, for example, the case does not necessarily need to be sealed. This makes it possible to simplify the configuration of the power storage module. In the case of using the cooling member and the heat transfer plate for dissipating heat from the power storage element, when the bulging portion formed by the bulging and deformation of the sealing body is not in contact with the heat transfer plate, the heat of the bulging portion is dissipated via a space with low heat conductivity (air). This causes a problem of poor heat dissipation property of the bulging portion. According to the present configuration, the heat transfer plate has the folded portion in abutment with the bulging portion of the sealing body, and thus the heat of the bulging portion is transmitted to the folded portion of the heat transfer plate to allow heat dissipation to the outside via the heat transfer plate, thereby achieving improvement in heat dissipation property.

Embodiments of the technique described herein are preferably as described below.

A front end side of the folded portion may have a bent portion that is bent to the bulging portion side.

This allows the bent portion to restrict the bulging of the bulging portion, and thus the bulging portion is easy to closely adhere to the folded portion, thereby improving the heat conductivity from the bulging portion to the heat transfer plate.

The bulging portion may be disposed inside the folded portion.

This enhances the heat transfer between the bulging portion and the folded portion.

The power storage module may include a plurality of the cooling members, a plurality of the power storage elements, and a plurality of the heat transfer plates. The plurality of heat transfer plates may have the adjacent folded portions disposed with a space therebetween. The bulging portion may be sandwiched between the adjacent folded portions.

This suppresses reduction in heat conductivity resulting from a gap between the adjacent folded portions.

The power storage module may include the plurality of cooling members, the plurality of power storage elements, and the plurality of heat transfer plates. The plurality of heat transfer plates may have the adjacent folded portions disposed with the space therebetween. The plurality of heat transfer plates may include a spacer sandwiched between the adjacent folded portions in the plurality of heat transfer plates.

This facilitates the movement of heat between the heat transfer plates adjacent via the spacer, which makes it possible to dissipate heat from the power storage elements via the heat transfer plates and the spacer, thereby achieving improvement in heat dissipation property.

The cooling member may include an absorption member that is disposed in the sealing body to absorb the coolant.

This makes the coolant easy to move by the absorption member, which makes it possible to improve the cooling performance of the cooling member.

Advantageous Effect of the Invention

According to the technique described herein, it is possible to simplify the configuration of the power storage module.

MODES FOR CARRYING OUT THE INVENTION

First Embodiment

A first embodiment will be described with reference to FIGS. 1 to 8. A power storage module 10 in the present embodiment is mounted in a vehicle such as an electric car or hybrid car, for example, to supply electric power to a load such as a motor. Although the power storage module 10 can be disposed in any orientation, the following descriptions are based on the assumption that an X direction is a leftward direction, a Y direction is a forward direction, and a Z direction is an upward direction.

(Power Storage Module 10)

Figure 4:
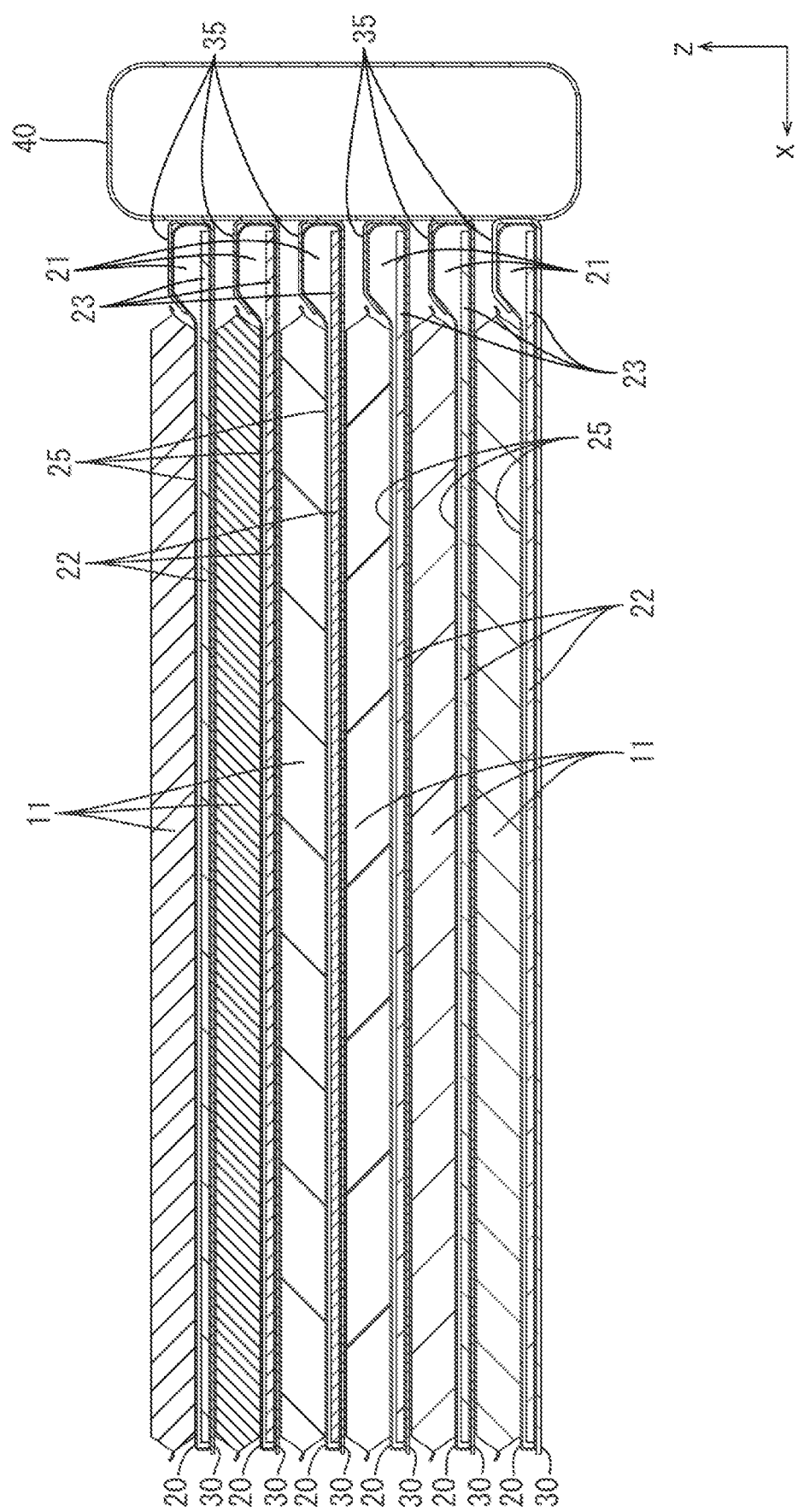
FIG. 4 is a cross-sectional view of FIG. 2 taken along line A-A.

As illustrated in FIG. 4, the power storage module 10 includes a plurality of (six in the present embodiment) power storage elements 11, a plurality of (six in the present embodiment) cooling members 20 that are stacked on the power storage elements 11 to cool the power storage elements 11, and a plurality of (six in the present embodiment) heat transfer plates 30 that are stacked between the cooling members 20 and the power storage elements 11 to transmit heat from the cooling members 20 and the power storage elements 11.

(Power Storage Elements 11)

Figure 1:
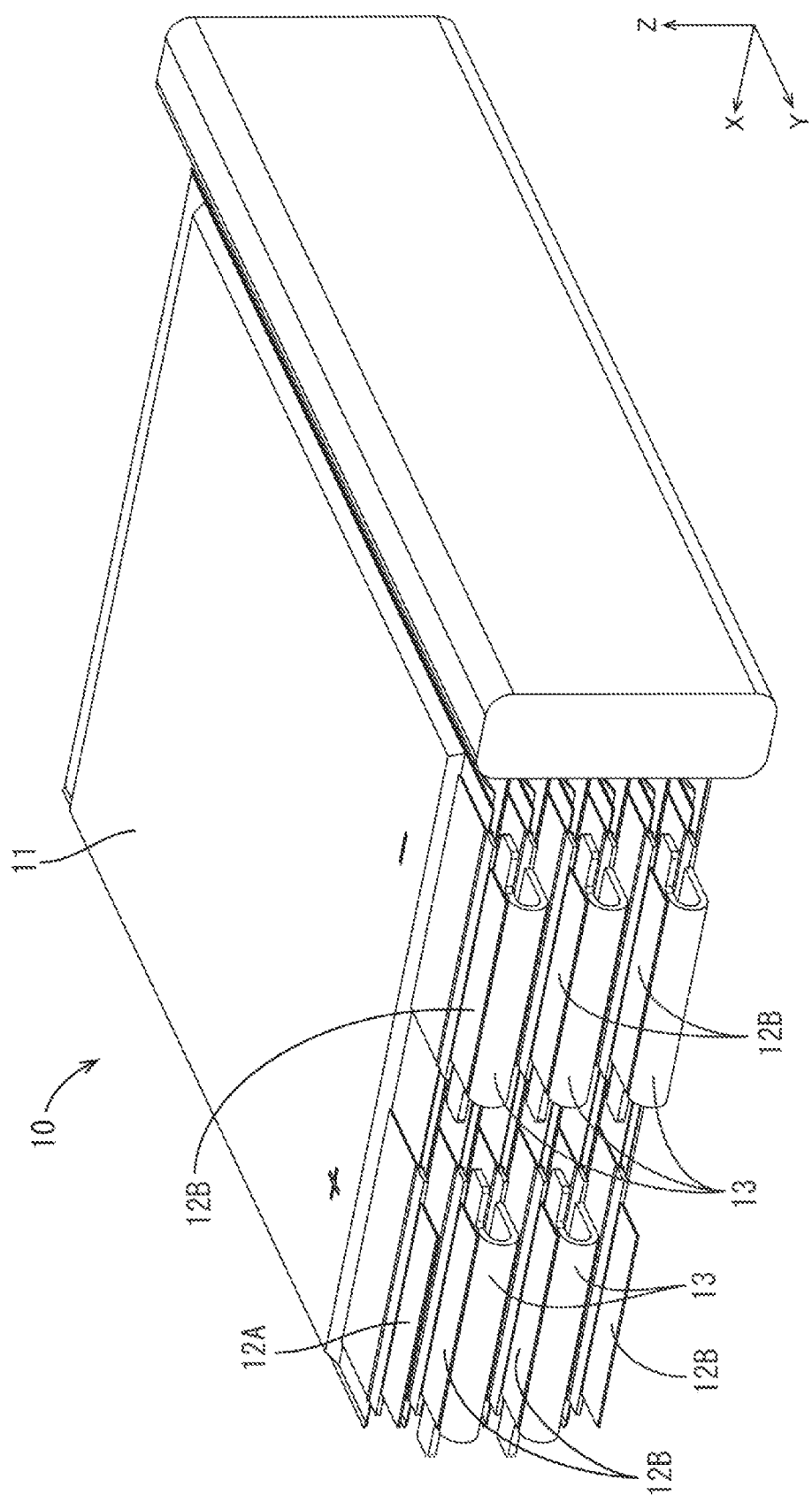
FIG. 1 is a perspective view of a power storage module in a first embodiment.
Figure 2:
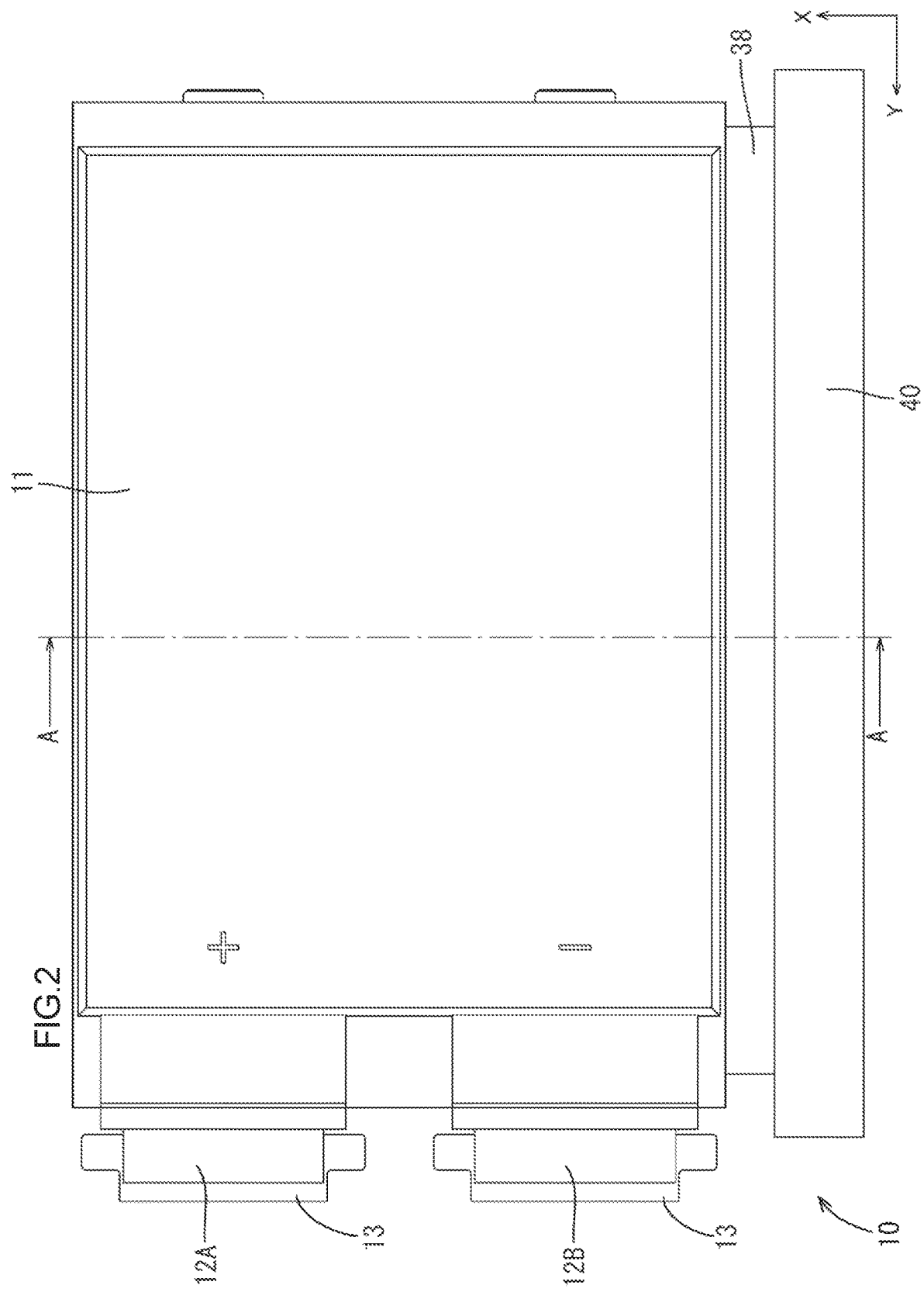
FIG. 2 is a planar view of the power storage module.
Figure 3:
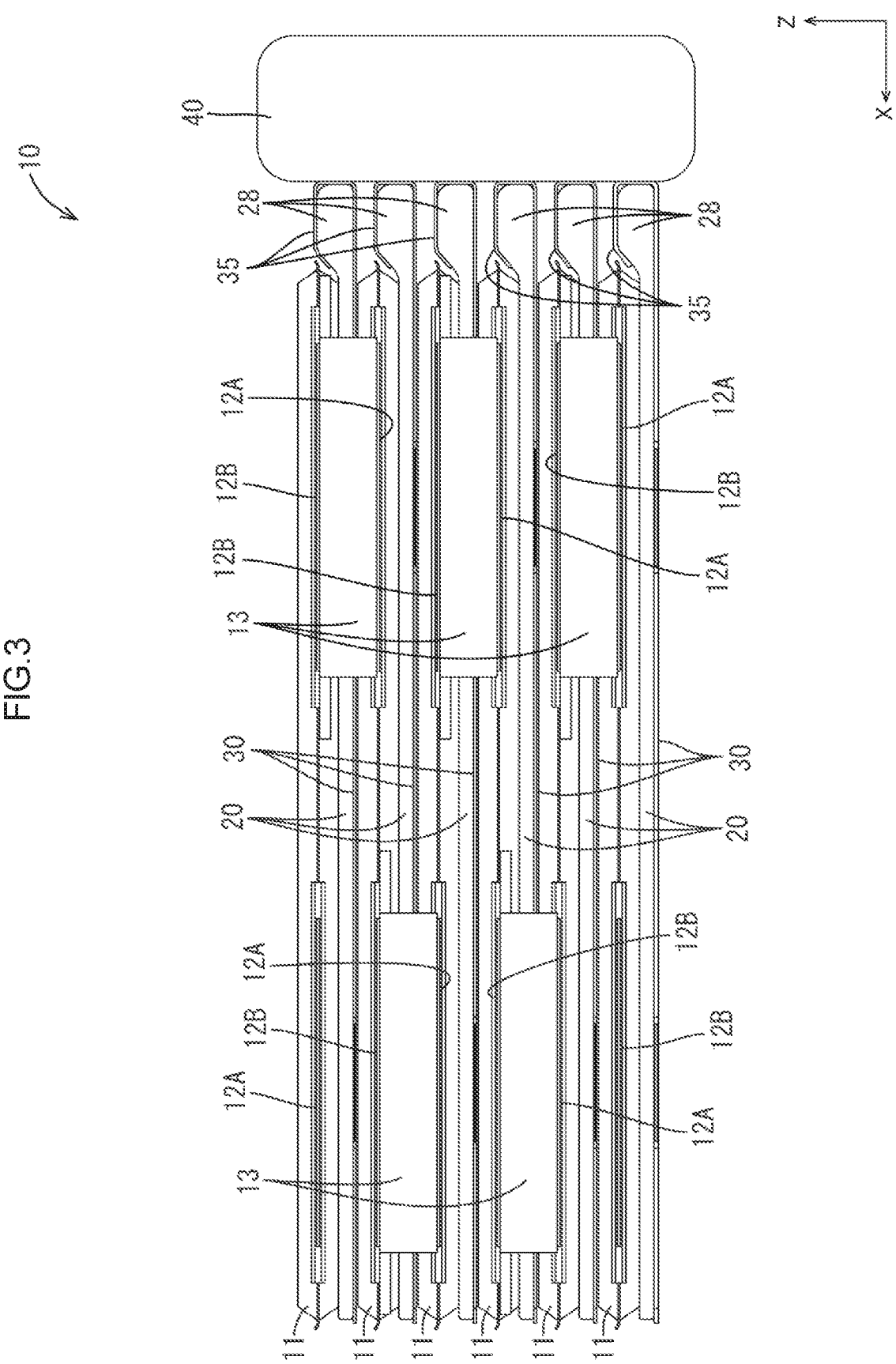
FIG. 3 is a front view of the power storage module.

Each of the power storage elements 11 is formed by sandwiching a power storage factor not illustrated between a pair of battery laminate sheets and bonding side edges of the battery laminate sheets in a liquid-tight manner by a publicly known method such as heat welding. A positive electrode terminal 12A and a negative electrode terminal 12B in metallic foil form protrude from the front end edge of each of the power storage elements 11, from inside to outside of the battery laminate sheets in a liquid-tight state with the inner surface of the battery laminate sheet as illustrated in FIG. 1. The electrode terminal 12A and the electrode terminal 12B of each of the power storage elements 11 are disposed with a space therebetween and are electrically connected to the internal power storage factor.

The plurality of power storage elements 11 are vertically aligned and the adjacent power storage elements 11 are disposed such that one electrode terminal 12A is positioned next to the other electrode terminal 12B. The adjacent electrode terminal 12A and electrode terminal 12B are electrically connected together via a plurality of (five in the present embodiment) U-shaped connection members 13. The electrode terminals 12A, 12B and the connection members 13 are connected together by a publicly known method such as laser welding, ultrasonic welding, or brazing, for example. The adjacent electrode terminals 12A and 12B are connected by the connection members 13, so that the plurality of power storage elements 11 are connected in series.

In the present embodiment, examples of the power storage elements 11 include secondary batteries such as lithium-ion secondary batteries or nickel-metal-hydride secondary batteries, capacitors such as electric double-layer capacitors or lithium ion capacitors, and any type can be selected as necessary.

(Cooling Members 20)

Each of the cooling members 20 includes a coolant 21 that varies between liquid and gaseous states, an absorption member 22 that absorbs the coolant 21, and a sealing body 25 that hermetically seals the coolant 21 and the absorption member 22, as illustrated in FIG. 4. The coolant 21 can be one or more selected from a group consisting of perfluorocarbon, hydrofluoroether, hydrofluoroketone, fluorine inert liquid, water, and alcohols such as methanol and ethanol, for example. The coolant 21 may have insulating properties or conductive properties. The amount of the coolant 21 sealed in the sealing body 25 can be selected as necessary.

The absorption member 22 has a substantially rectangular sheet shape. The absorption member 22 is formed from a material that can absorb the coolant 21. The absorption member 22 may be formed by processing a material configured to absorb the coolant 21 in fiber form and weaving into a fabric or may be formed from a non-woven fabric. The form of the non-woven fabric may be fiber sheet, web (thin film sheet made of fiber only), or bat (blanket-like fiber). The material for the absorption member 22 may be natural fiber, synthetic fiber formed from synthetic resin, or a combination of natural fiber and synthetic fiber.

The absorption member 22 is disposed in a wide region as compared to the region overlapping the power storage element 11, and thus the absorption member 22 in the sealing body 25 includes an absorption extension portion 23 that is extended from the region overlapping the power storage element 11 to a region not overlapping the power storage element 11.

The sealing body 25 can be formed by bonding together two substantially rectangular sheet members in a liquid-tight manner by a publicly known method such as adhesion, welding, or deposition, for example. Each of the sheet members is formed by laminating a synthetic resin film to the both sides of a metallic sheet. The metal constituting the metallic sheet can be any metal selected from among aluminum, aluminum alloy, copper, and copper alloy as necessary. The synthetic resin constituting a synthetic resin film can be any synthetic resin selected from among polyolefins such as polyethylene and polypropylene, polyesters such as polybutylene terephthalate and polyethylene terephthalate, polyamides such as nylon 6 and nylon 6, 6 as necessary. The sealing body 25 according to the present embodiment is formed by stacking and thermally fusing the surfaces of two sheet members with synthetic resin films.

Figure 5:
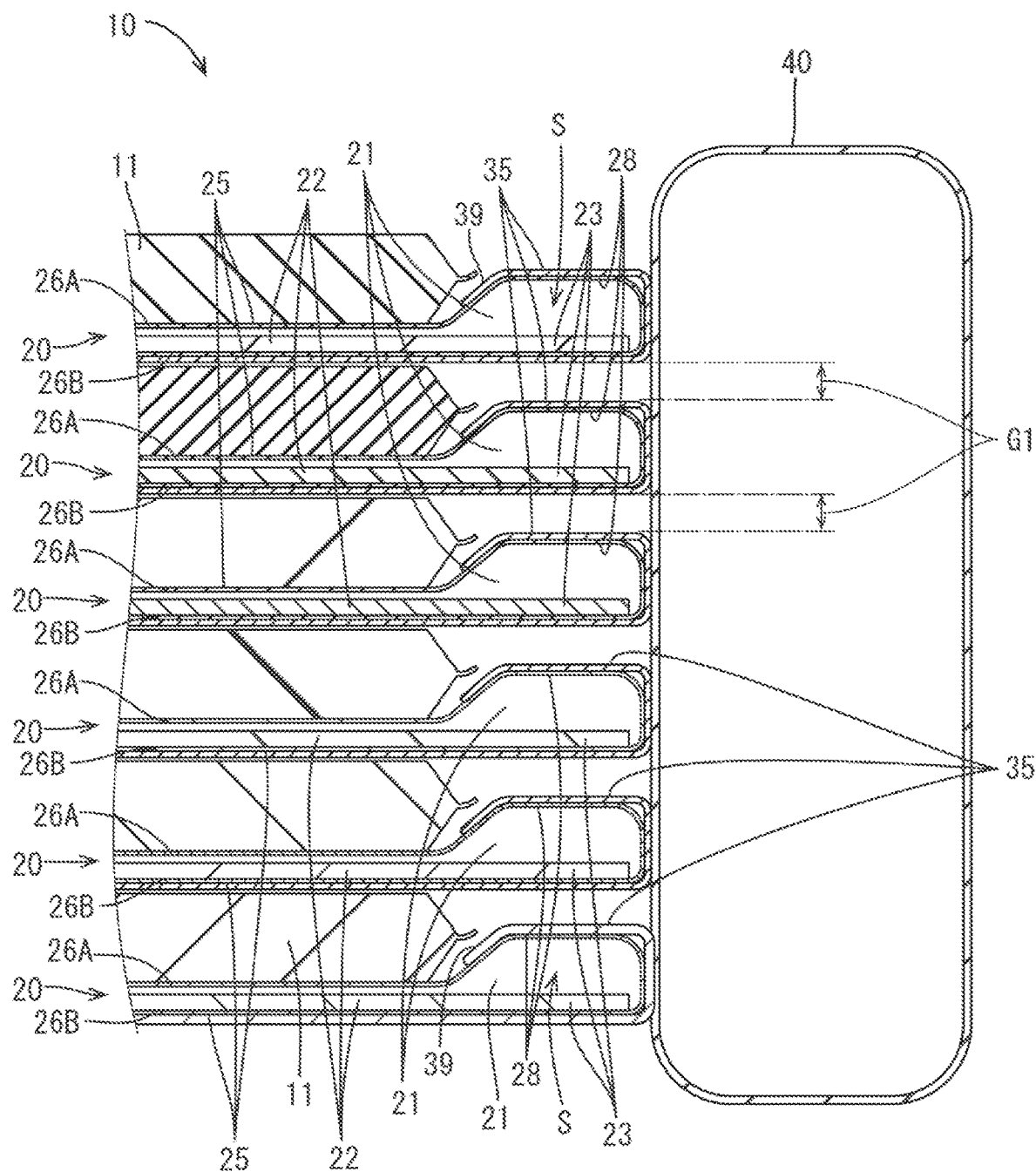
FIG. 5 is a partially enlarged cross-sectional view of FIG. 4.
Figure 6:
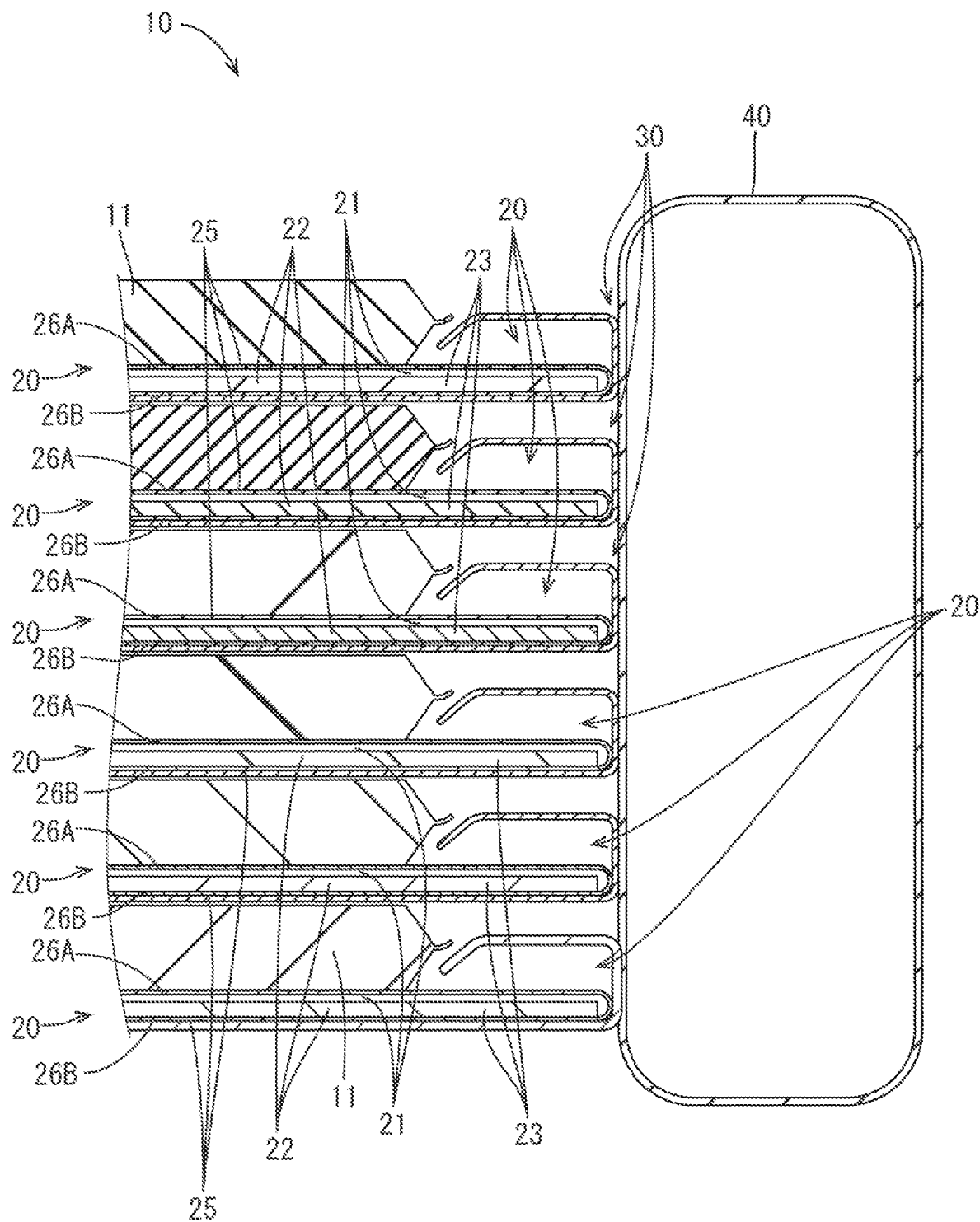
FIG. 6 is a cross-sectional view of FIG. 5 in which a sealing body is not bulged or deformed.

The sealing body 25 has a first sheet portion 26A to cover the upper side of the absorption member 22 and a second sheet portion 26B to cover the lower side of the absorption member 22 as illustrated in FIG. 6. The upper surface of the first sheet portion 26A is in contact with the lower surface of the power storage element 11 and the lower surface of the second sheet portion 26B is in contact with the upper surface of the heat transfer plate 30. A portion of the first sheet portion 26A extended to a region not overlapping the power storage element 11 and covering the absorption extension portion 23 of the absorption member 22 is set as a bulging portion 28 that is deformable by evaporation of the coolant 21 in the sealing body 25 as illustrated in FIG. 5.

The bulging portion 28 is formed when the sealing body 25 becomes deformed and bulged with a rise in the inner pressure of the sealing body 25 caused by evaporation of the coolant 21 in the sealing body 25. The portion of the sealing body 25 other than the bulging portion 28 does not bulge or deform even with a rise in the inner pressure caused by evaporation of the coolant 21 in the sealing body 25 because the portion is in contact with the power storage element 11 and the heat transfer plate 30 and is restricted in bulging.

(Heat Transfer Plates 30)

Figure 7:
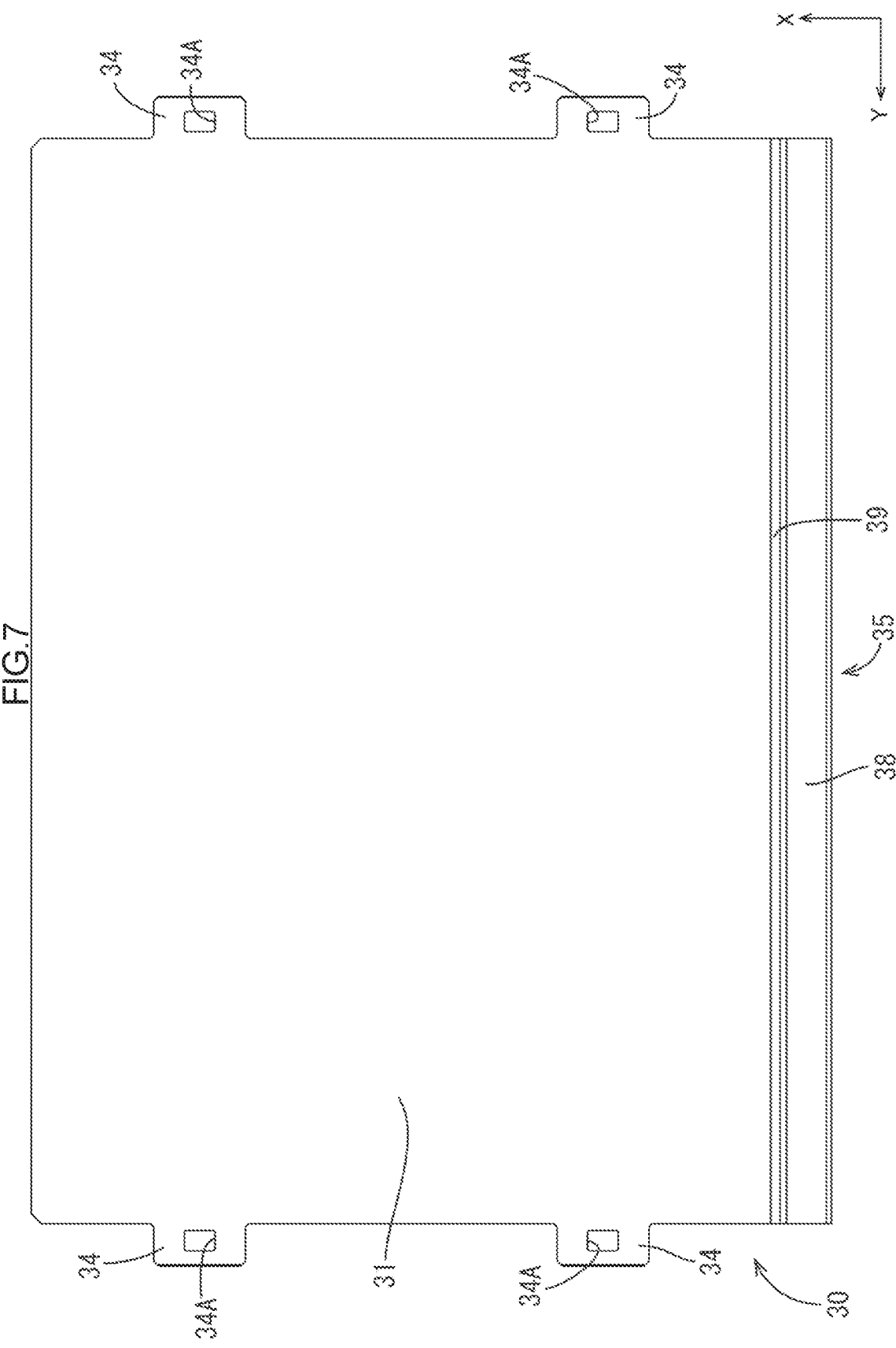
FIG. 7 is a planar view of a heat transfer plate.
Figure 8:
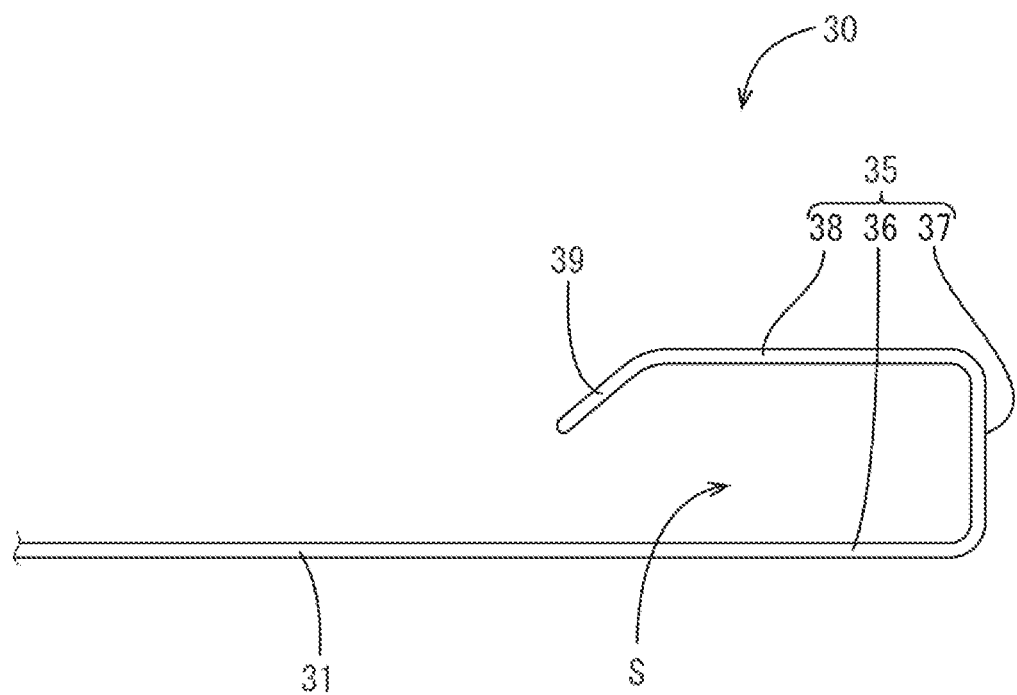
FIG. 8 is a front view of the heat transfer plate.
Figure 9:
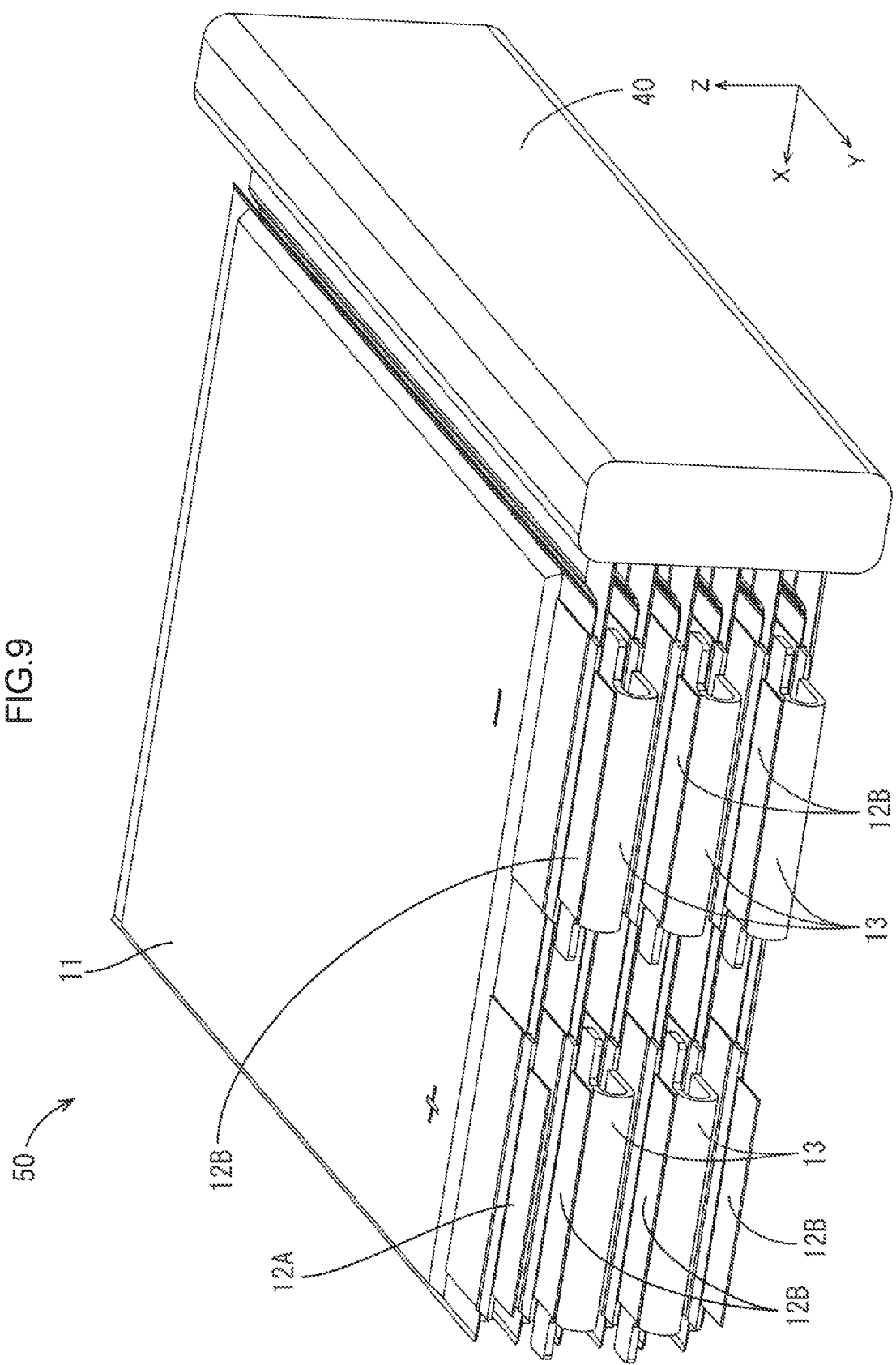
FIG. 9 is a perspective view of a power storage module in a second embodiment.
Figure 10:
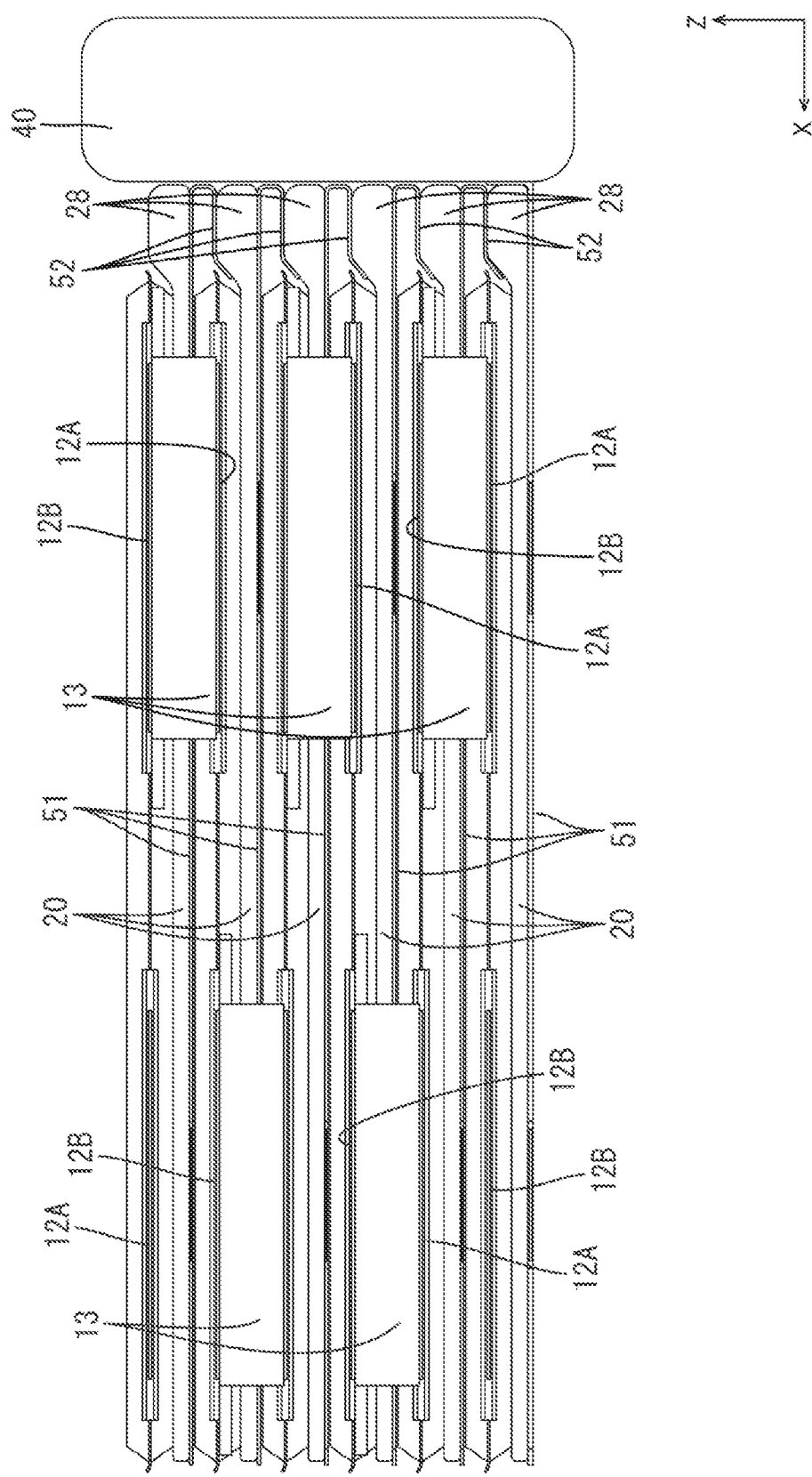
FIG. 10 is a front view of the power storage module.
Figure 11:
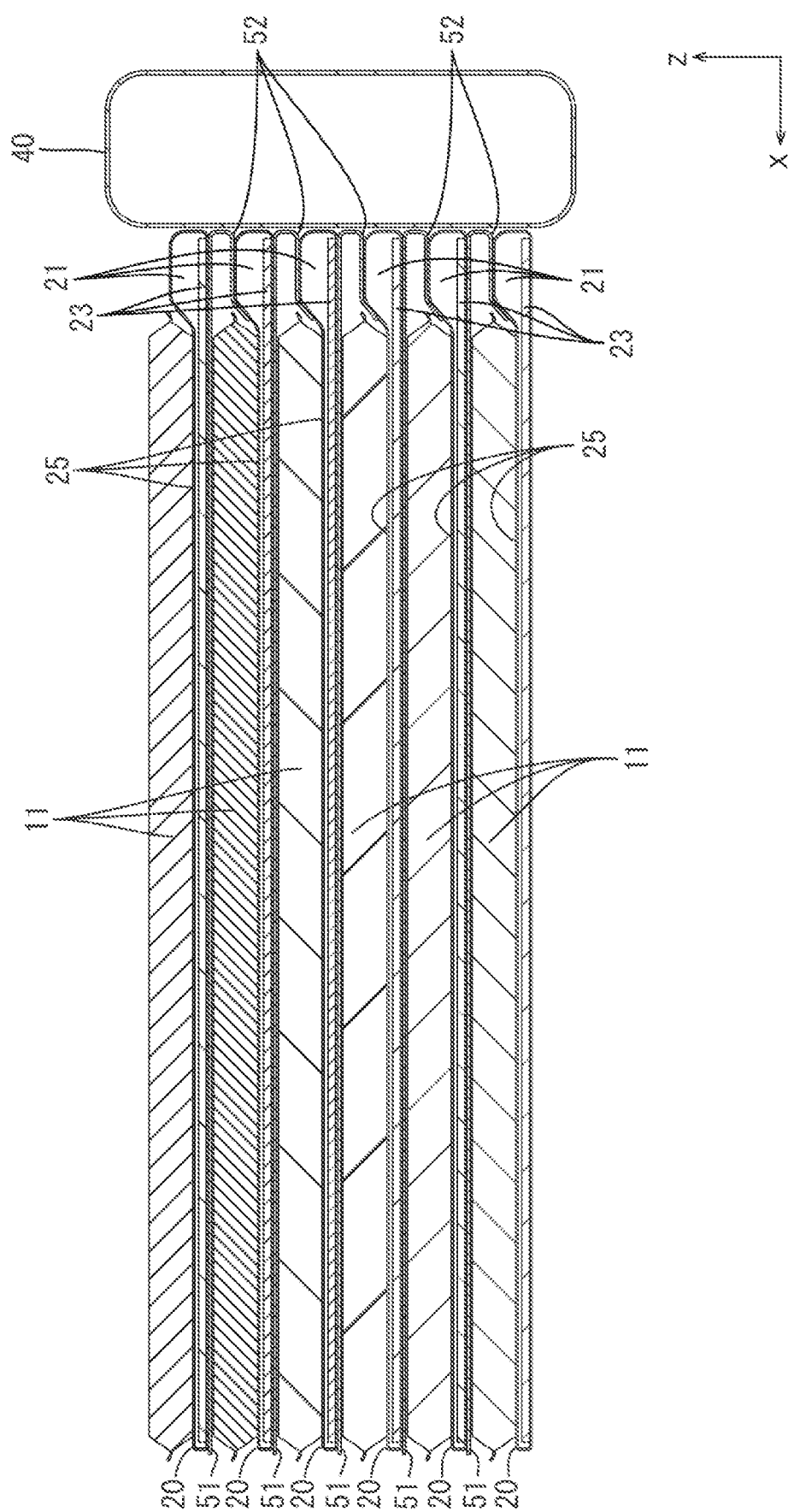
FIG. 11 is a cross-sectional view of the power storage module.

Each of the heat transfer plates 30 is stacked on the power storage element 11 with the cooling member 20 therebetween and is formed from a member with high thermal conductivity such as aluminum, aluminum alloy, copper, or copper alloy. As illustrated in FIGS. 7 and 8, each of the heat transfer plates 30 has a rectangular shape and has a contact portion 31 in contact with the power storage element 11 and the second sheet portion 26B and a folded portion 35 that is connected to a lateral side of the contact portion 31 and folded in a U shape. The contact portion 31 has a rectangular shape and is stacked on a region of the power storage element 11 to receive heat from the power storage element 11. The contact portion 31 have a pair of protrusion pieces 34 on the front and back sides at end edges extending to regions not overlapping the power storage element 11. Each of the protrusion pieces 34 has a rectangular through hole 34A.

The folded portion 35 includes a heat transfer extension portion 36 that extends flush with the contact portion 31 on the right side of the contact portion 31, an end wall 37 that is erected from the end edge of the heat transfer extension portion 36 in a direction orthogonal to the plate surface of the heat transfer extension portion 36, and a return portion 38 that extends leftward from the upper end of the end wall 37. The return portion 38 extends in parallel to the contact portion 31 and includes at a front end a bent portion 39 that bends at an obtuse angle to the contact portion 31 side. The height of the end wall 37 is sized to form a gap G1 (see FIG. 5) between the return portion 38 connected to the end wall 37 and the heat transfer extension portion 36 of the heat transfer plate 30 on the upper-stage side (adjacent).

Each of the heat transfer plates 30 has a storage space S that can store the bulging portion 28 of the sealing body 25 between the heat transfer extension portion 36 and the return portion 38. The folded portion 35 is shaped such that the bulging portion 28 abuts with the inner surface of the folded portion 35 according to the size of the bulging portion 28 formed by the bulging and deformation of the sealing body 25. In the present embodiment, the bulging portion 28 is shaped such that the outer surface of the bulging portion 28 closely adheres to the inner surface of the folded portion 35. The bulging portion 28 in the present embodiment slightly presses the inner surface of the folded portion 35.

(Heat Dissipation Member 40)

As illustrated in FIG. 5, a heat dissipation member 40 is disposed on a lateral side of the power storage module 10 to dissipate heat having been transferred to the heat transfer plates 30 to the outside. The left side surface (power storage module 10 side surface) of the heat dissipation member 40 closely adheres to the outer surfaces of the end walls 37 of the heat transfer plates 30. The heat dissipation member 40 is formed from a metal such as aluminum or aluminum alloy and has an inlet opening and an outlet opening for a cooling material not illustrated. A cooling liquid as a cooling material is introduced into the lower inlet opening and discharged from the upper outlet opening. The cooling liquid circulates through a heat dissipation path not illustrated to dissipate heat having been transferred to the cooling liquid to the outside. The heat dissipation member 40 may have a pipe (not illustrated) for passage of the cooling liquid entirely extending inside with a plurality of folds. In the present embodiment, the cooling liquid is water. However, the cooling liquid is not limited to this but may be a liquid such as oil. Alternatively, the cooling liquid may be an antifreeze liquid. In addition, the cooling liquid is not limited to a liquid but may be a gas.

The present embodiment produces the following operations and advantageous effects.

The power storage module 10 includes the cooling member 20 that has the coolant 21 and the sealing body 25 hermetically sealing the coolant 21; the power storage element 11 that is stacked on the cooling members 20; and the heat transfer plate 30 that is stacked on the power storage elements 11 with the cooling members 20 between the heat transfer plate 30 and the power storage element 11. The sealing body 25 is configured to form the bulging portion 28 deformed by evaporation of the coolant 21 in a region not overlapping the power storage element 11. The heat transfer plate 30 has the folded portion 35 with which the bulging portion 28 is configured to abut.

According to the present embodiment, it is possible to dissipate heat from the power storage element 11 via the cooling member 20 in which the coolant 21 is sealed in the sealing body 25 and the heat transfer plate 30. Accordingly, as compared to the configuration in which the coolant 21 is charged in the case where the power storage element 11 is stored, for example, the case does not necessarily need to be sealed. This makes it possible to simplify the configuration of the power storage module 10. In the case of using the cooling member 20 and the heat transfer plate 30 for dissipating heat from the power storage element 11, when the bulging portion 28 formed by the bulging and deformation of the sealing body 25 is not in contact with the heat transfer plate 30, the heat of the bulging portion 28 is dissipated via a space with low heat conductivity (air), which causes a problem of poor dissipation of heat from the bulging portion 28. According to this configuration, each of the heat transfer plates 30 has the folded portion 35 in abutment with the bulging portion 28 of the sealing body 25, and thus the heat of the bulging portion 28 is transmitted to the folded portion 35 of the heat transfer plate 30 to allow heat dissipation to the outside via the heat transfer plate 30, thereby achieving improvement in heat dissipation property.

In addition, the front end side of the folded portion 35 has the bent portion 39 that is bent to the bulging portion 28 side.

This allows the bent portion 39 to abut with the bulging portion 28 and restrict the bulging and deformation of the bulging portion 28 at or beyond a predetermined level, and thus the bulging portion 28 can closely adhere to the folded portion 35 in an easy manner, thereby improving the heat conductivity from the bulging portion 28 to the heat transfer plate 30.

The bulging portion 28 is disposed inside the folded portion 35.

This enhances the heat transfer property between the bulging portion 28 and the folded portion 35.

The cooling member 20 includes the absorption member 22 that is disposed in the sealing body 25 to absorb the coolant 21.

This makes the coolant 21 easy to move by the absorption member 22, which makes it possible to improve the cooling performance of the cooling member 20.

Second Embodiment

Figure 12:
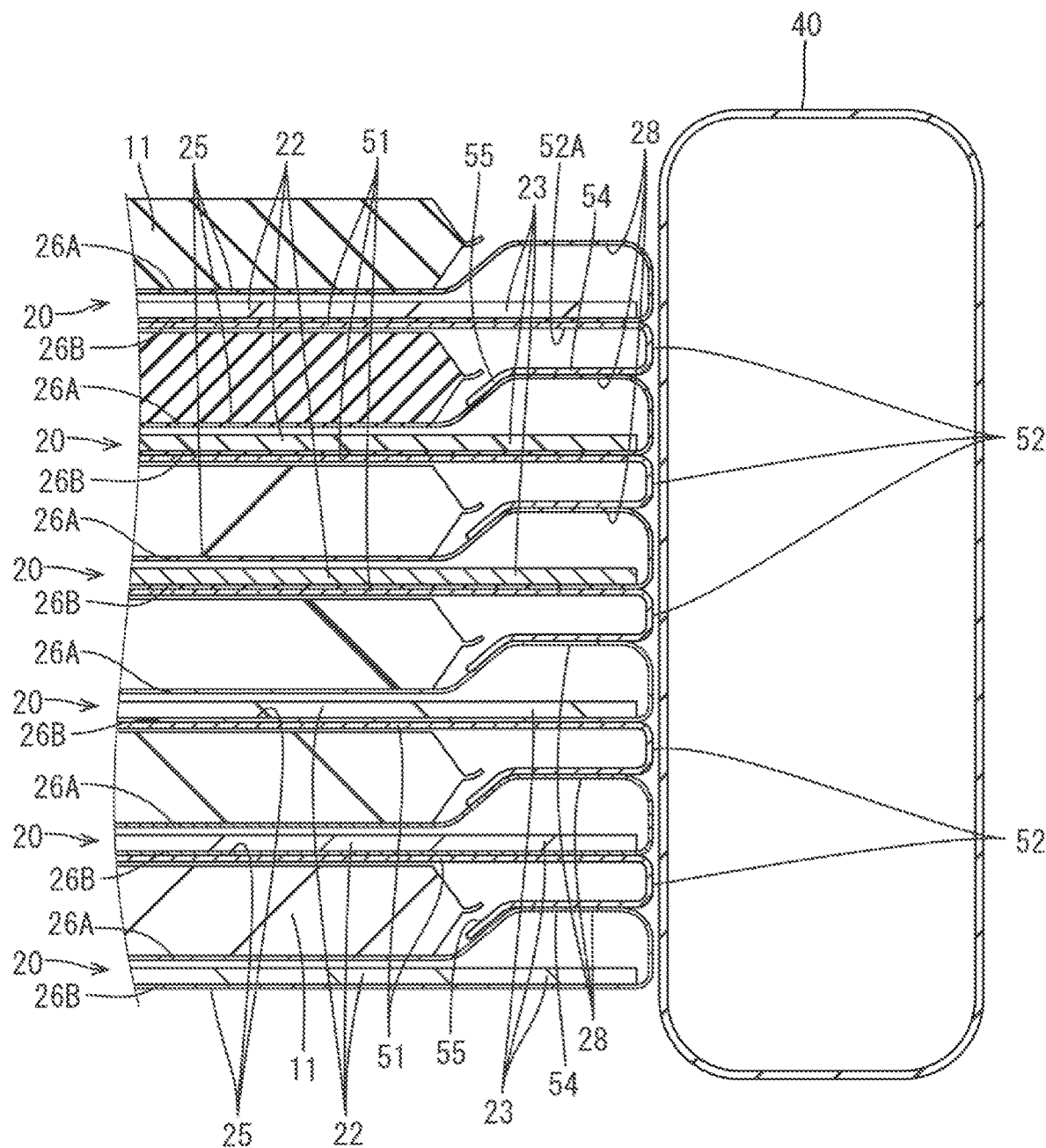
FIG. 12 is a partially enlarged cross-sectional view of FIG. 11.

Next, a second embodiment will be described with reference to FIGS. 9 to 14. In the first embodiment, the folded portion 35 of the heat transfer plate 30 is in abutment with the bulging portion 28 of the cooling member 20 placed on the heat transfer plate 30. A power storage module 50 in the second embodiment is configured such that a heat transfer plate 51 on which a cooling member 20 is placed is in abutment with a bulging portion 28 of the cooling member 20 on the lower-stage side (adjacent) as illustrated in FIG. 12. Hereinafter, the identical components to those in the first embodiment will be given the identical reference signs to those in the first embodiment and descriptions thereof will be omitted.

Figure 13:
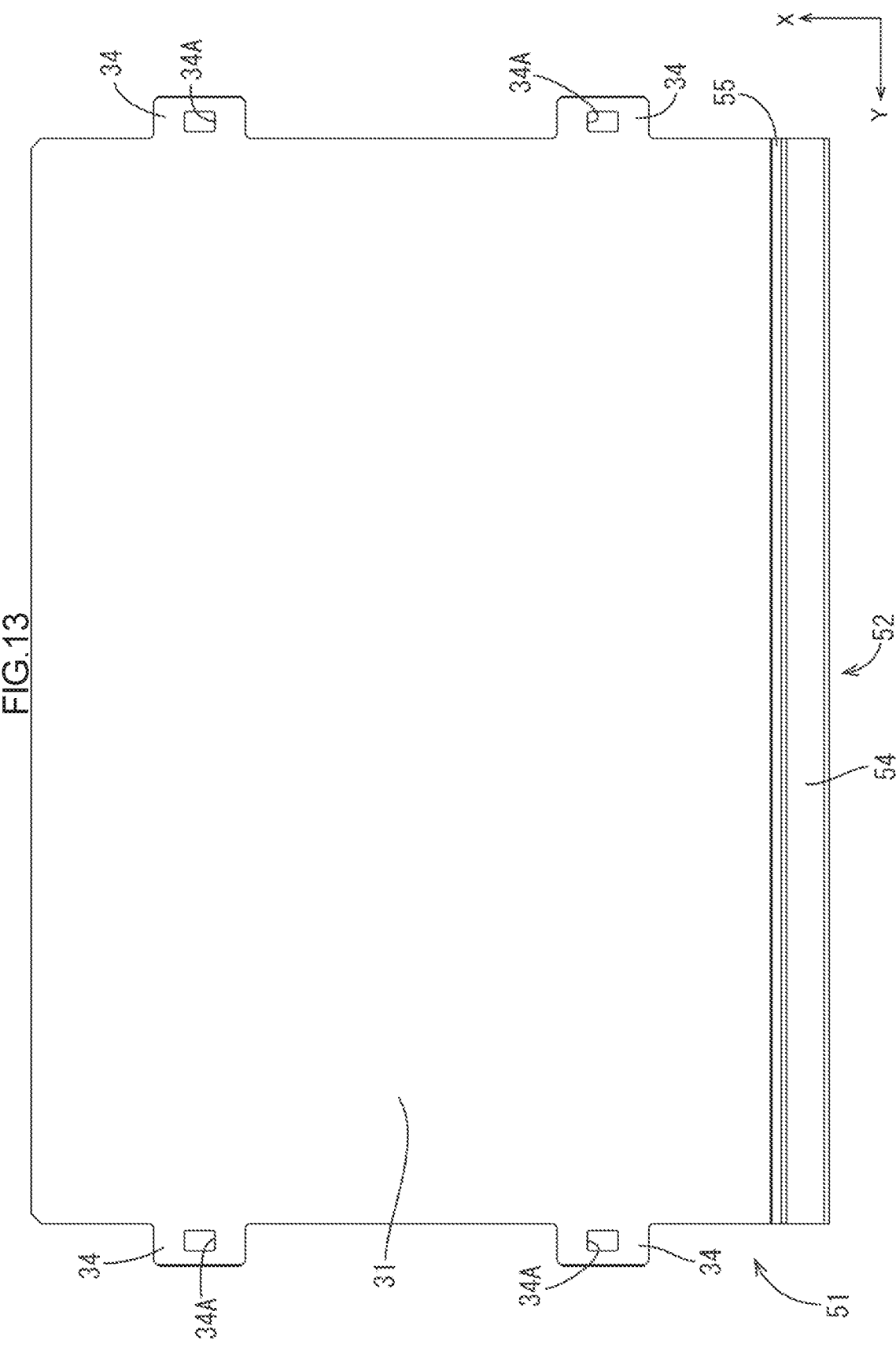
FIG. 13 is a bottom view of a heat transfer plate.
Figure 14:
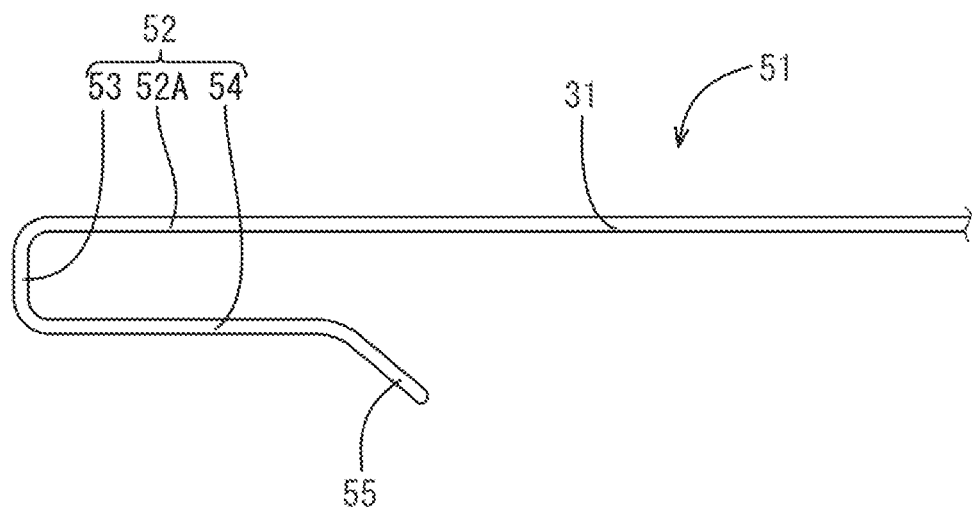
FIG. 14 is a rear view of the heat transfer plate.
Figure 15:
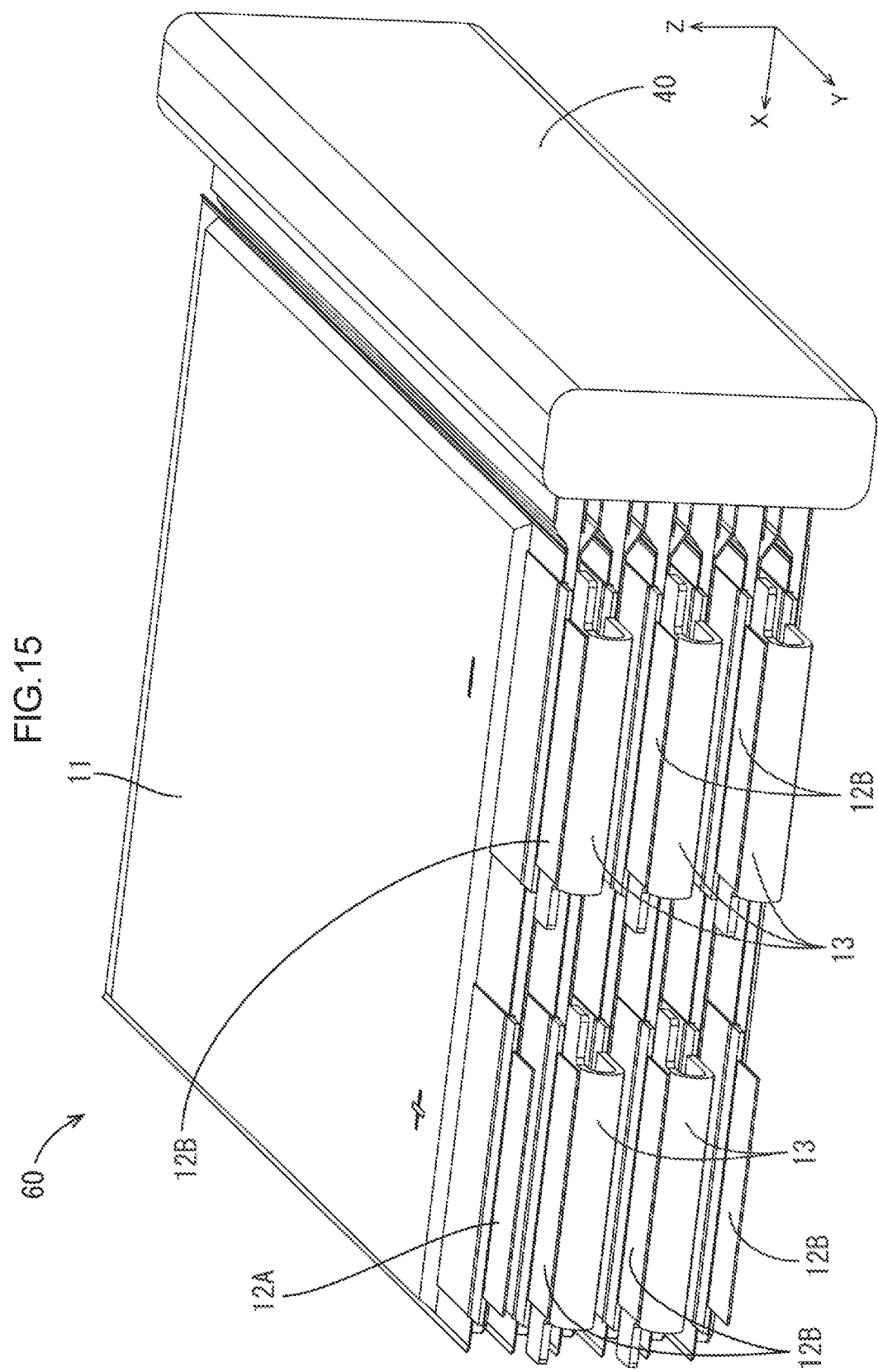
FIG. 15 is a perspective view of a power storage module in a third embodiment.
Figure 16:
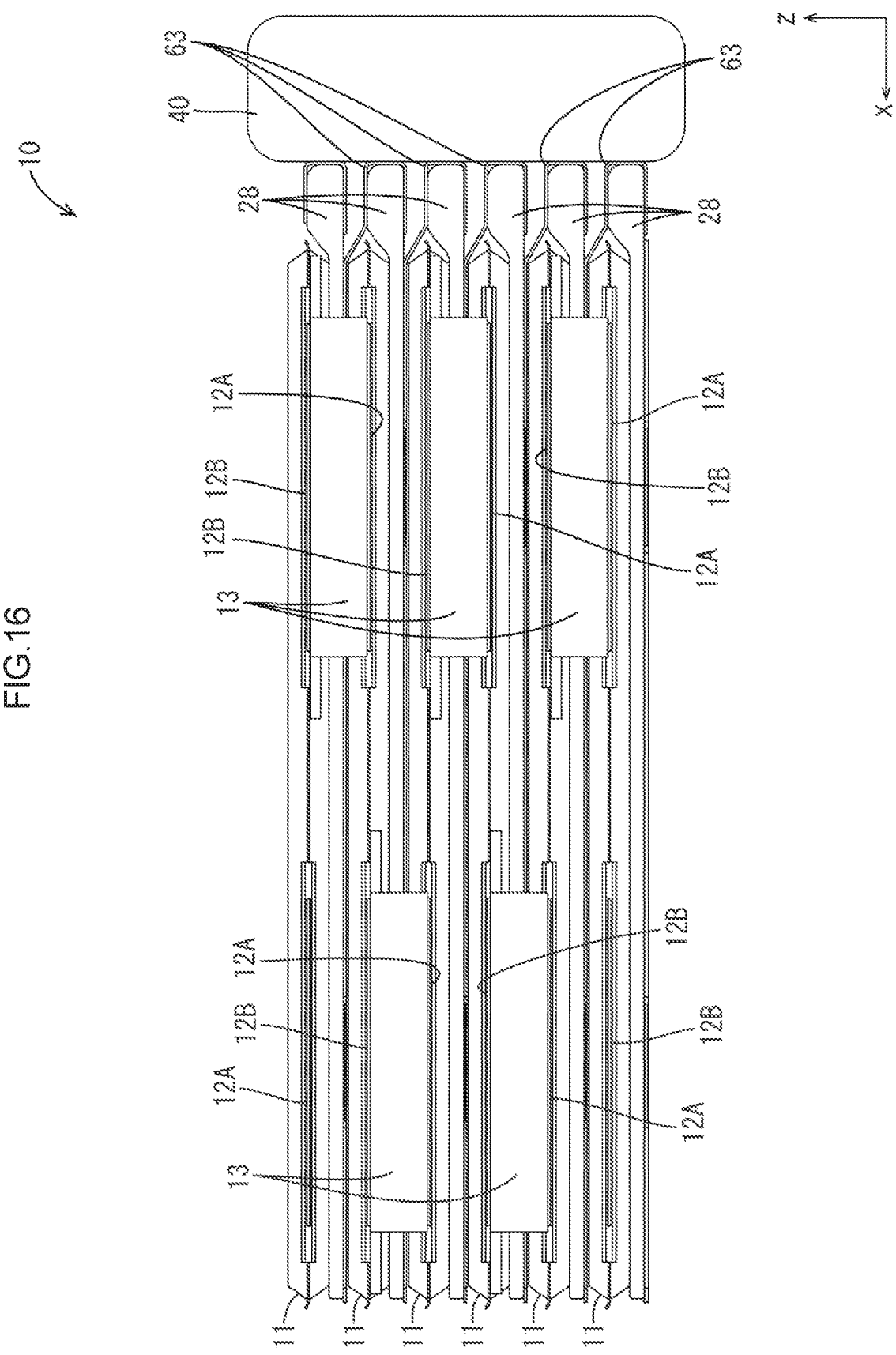
FIG. 16 is a front view of the power storage module.
Figure 17:
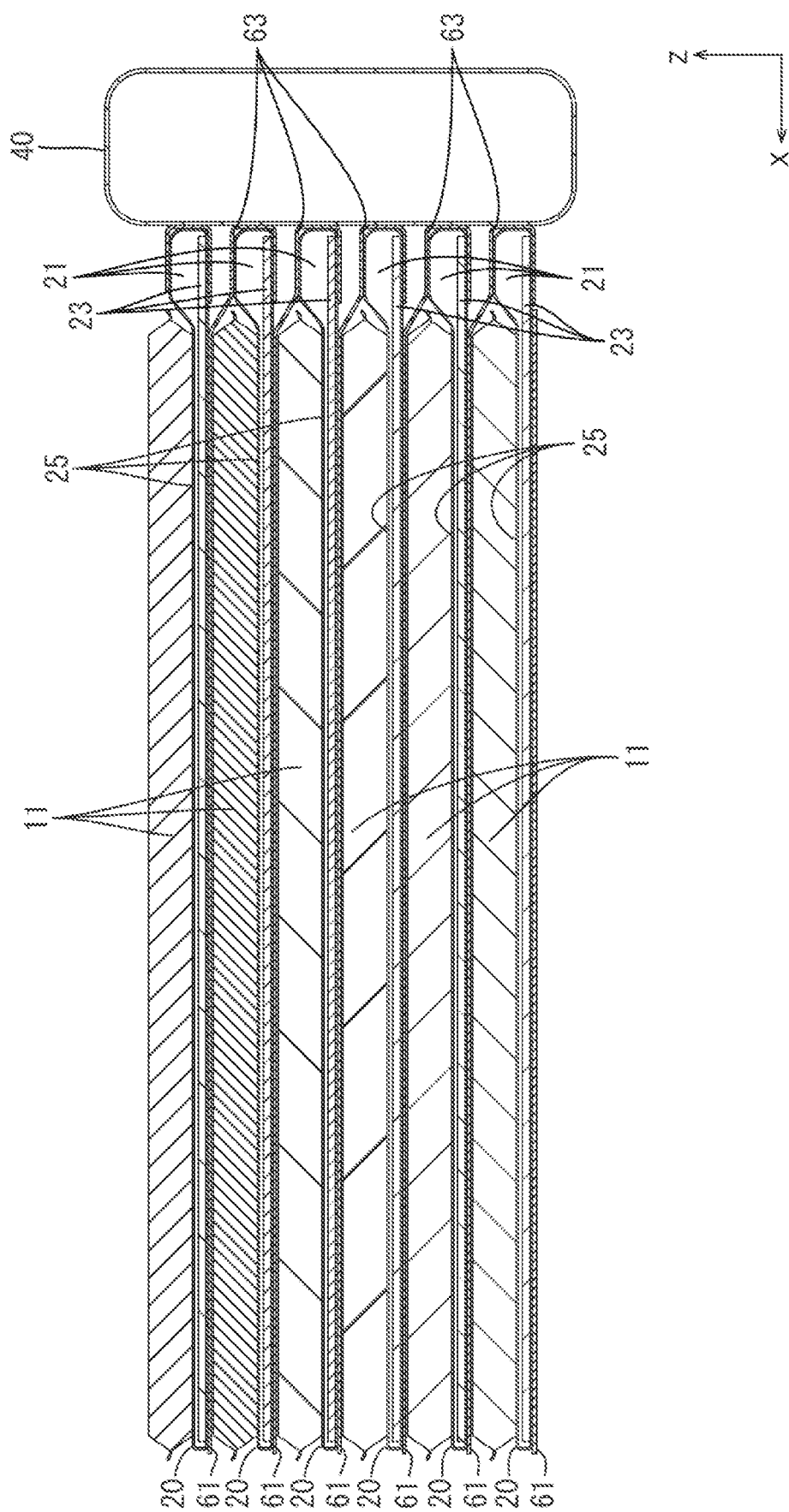
FIG. 17 is a cross-sectional view of the power storage module.

The heat transfer plates 51 are stacked on the power storage elements 11 with the cooling members 20 between the heat transfer plates 51 and the power storage elements 11. As illustrated in FIGS. 13 and 14, each of the heat transfer plates 51 has a rectangular shape and has a flat plate-shaped contact portion 31 that overlaps the cooling member 20 and a folded portion 52 that is folded from one side end edge of the contact portion 31.

The folded portion 52 includes: a heat transfer extension portion 52A that extends flush with the contact portion 31; an end wall 53 that extends from an end edge of the heat transfer extension portion 52A in a direction orthogonal to the plate surface of the heat transfer extension portion 52A; and a return portion 54 that extends from a lower end of the end wall 37 in a direction orthogonal to the end wall 53 and parallel to the heat transfer extension portion 52A. The return portion 54 has on a front end side a bent portion 55 that bends to the side opposite to the contact portion 31. The height of the end wall 53 is set such that the bulging portion 28 of the cooling members 20 on the lower-stage side (adjacent) abuts with the return portion 54.

The heat transfer plate 51 forms a gap in which the bulging portion 28 of the sealing body 25 is disposed between the return portion 54 of the folded portion 52 and the heat transfer extension portion 52A of the folded portion 52 in the lower stage. The folded portion 52 is shaped such that the bulging portion 28 abuts with the inner surface of the folded portion 52 according to the size of the bulging portion 28 formed by deformation of the sealing body 25. Preferably, the folded portion 52 is shaped such that the outer surface of the bulging portion 28 closely adheres to the inner surface of the folded portion 52 to enhance the heat conductivity between the bulging portion 28 and the folded portion 52.

According to the second embodiment, the power storage module 50 includes the plurality of cooling members 20, the plurality of power storage elements 11, and the plurality of heat transfer plates 51. The plurality of heat transfer plates 51 have the adjacent folded portions 52 disposed with a space therebetween, and the bulging portion 28 is sandwiched between the adjacent folded portions 52.

This suppresses reduction in heat conductivity resulting from the gap between the adjacent folded portions 52.

Third Embodiment

Figure 18:
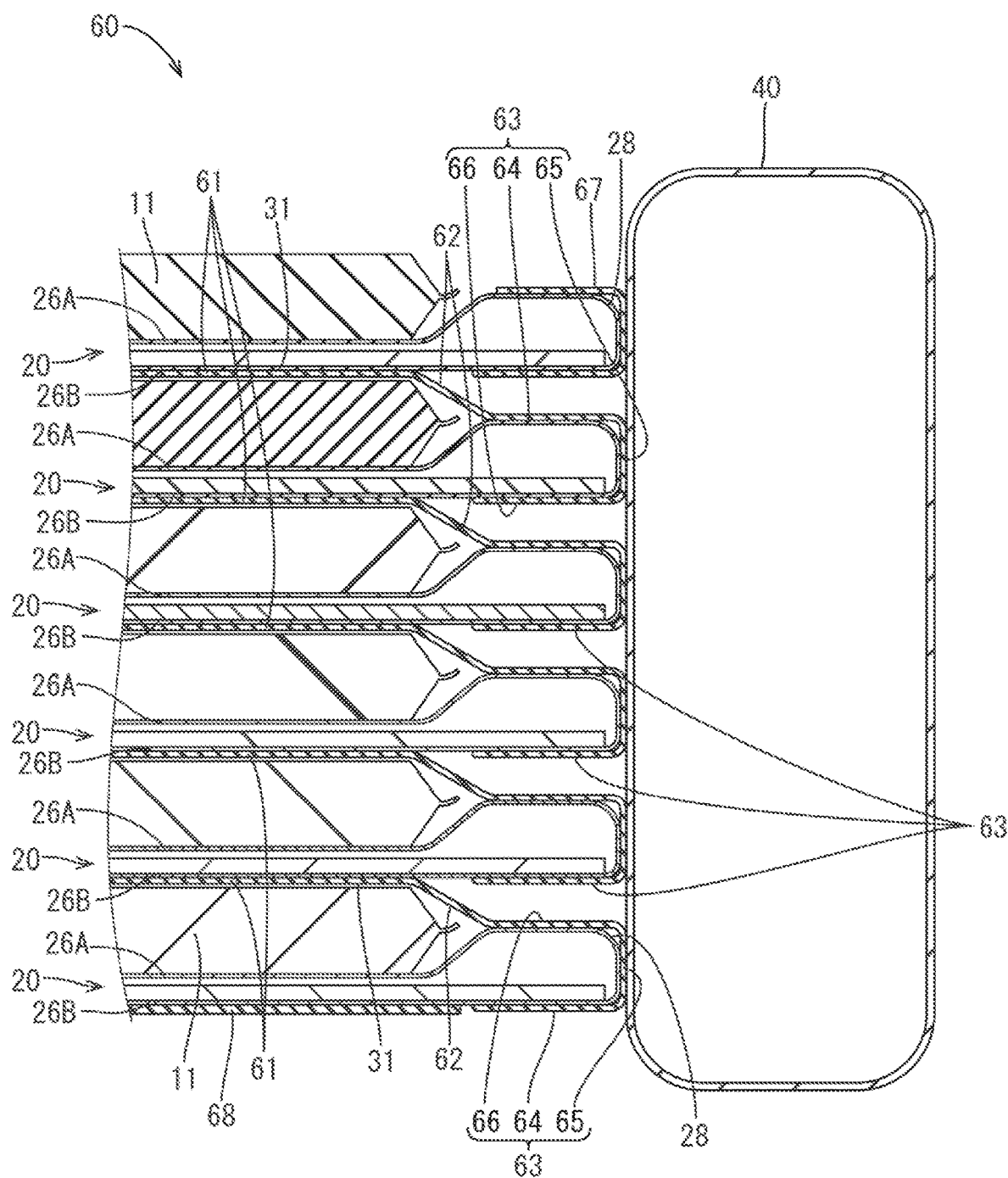
FIG. 18 is a partially enlarged cross-sectional view of FIG. 17.
Figure 19:
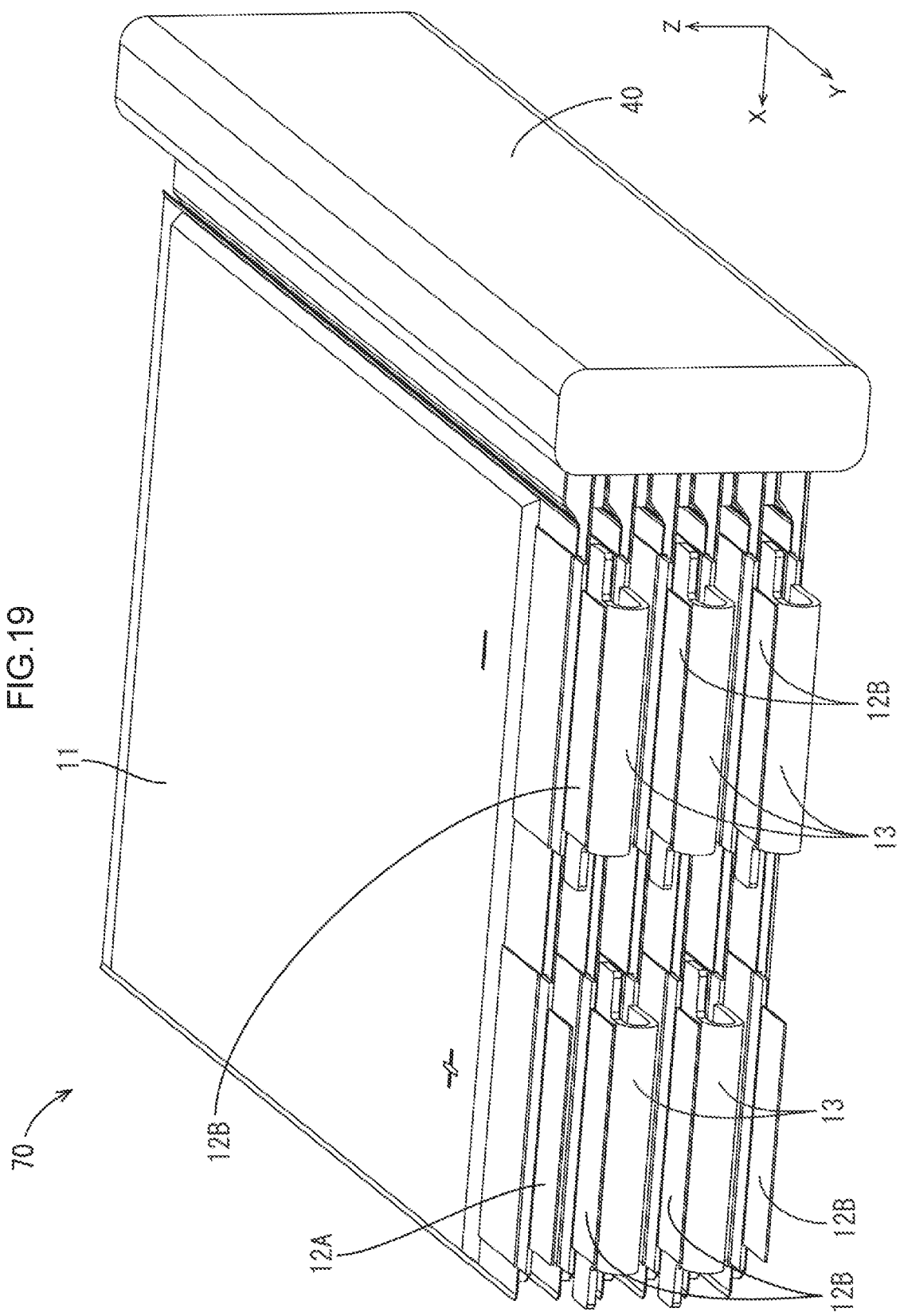
FIG. 19 is a perspective view of a power storage module in a fourth embodiment.
Figure 20:
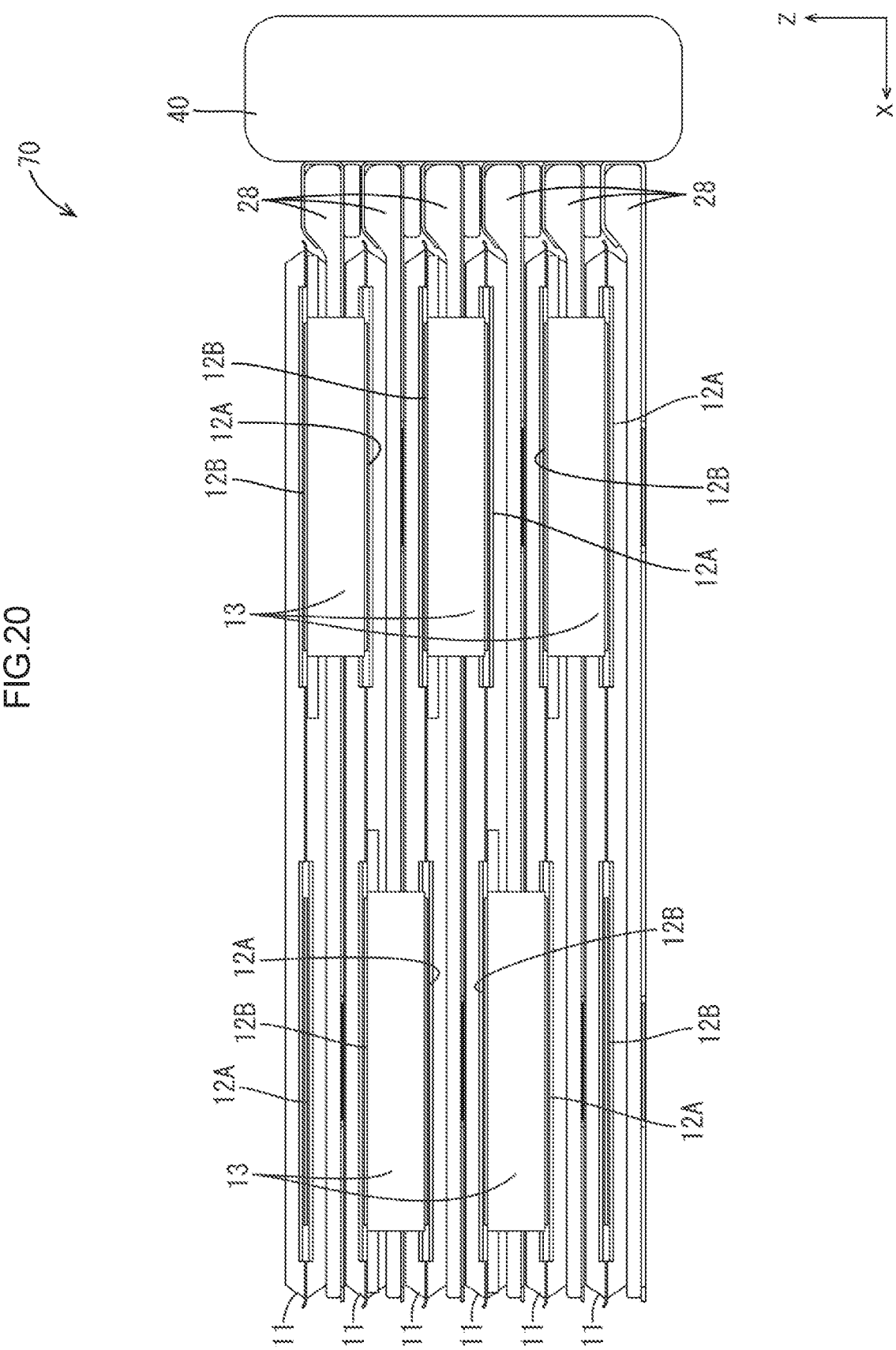
FIG. 20 is a front view of the power Storage module.
Figure 21:
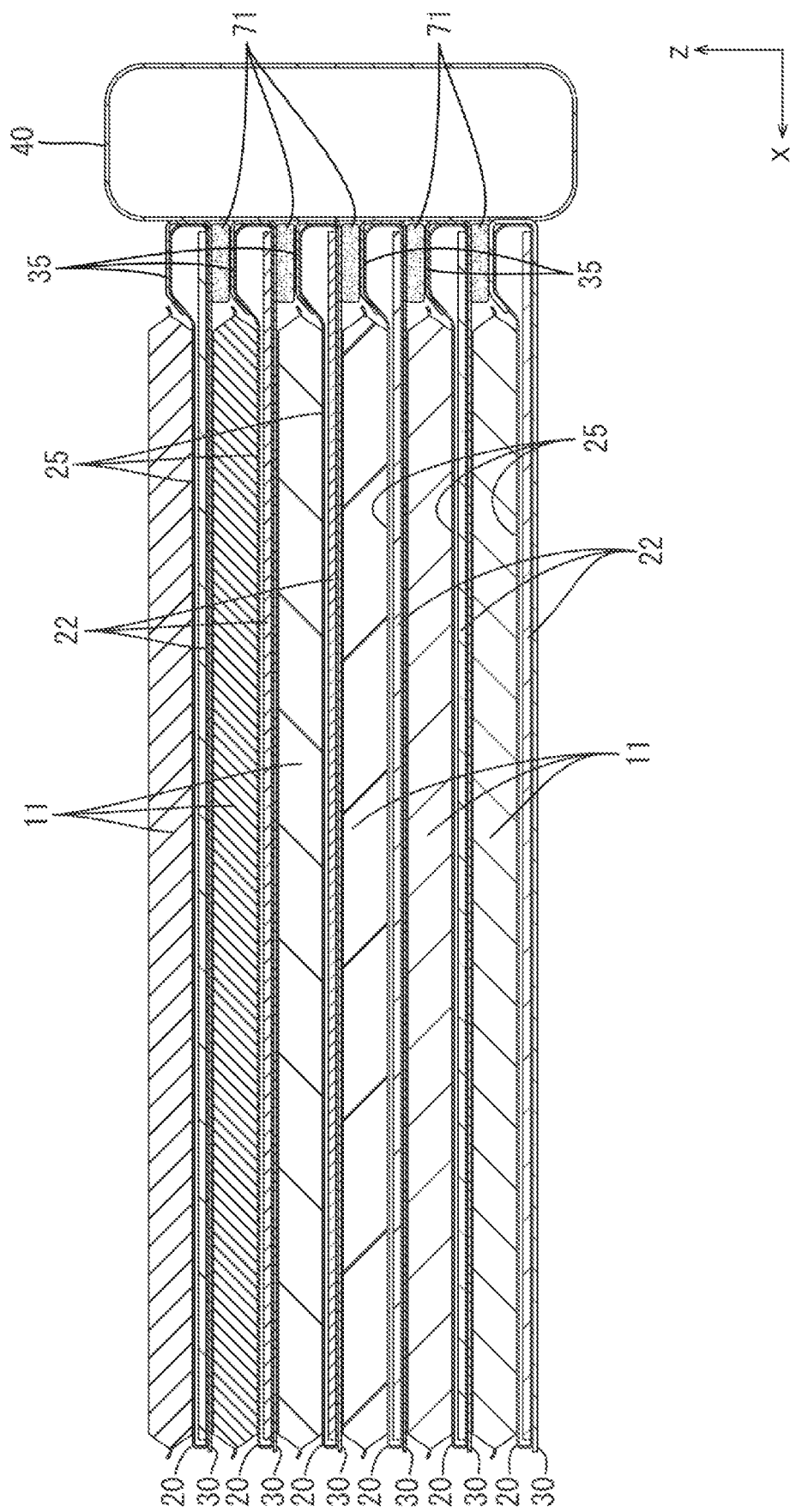
FIG. 21 is a cross-sectional view of the power storage module.
Figure 22:
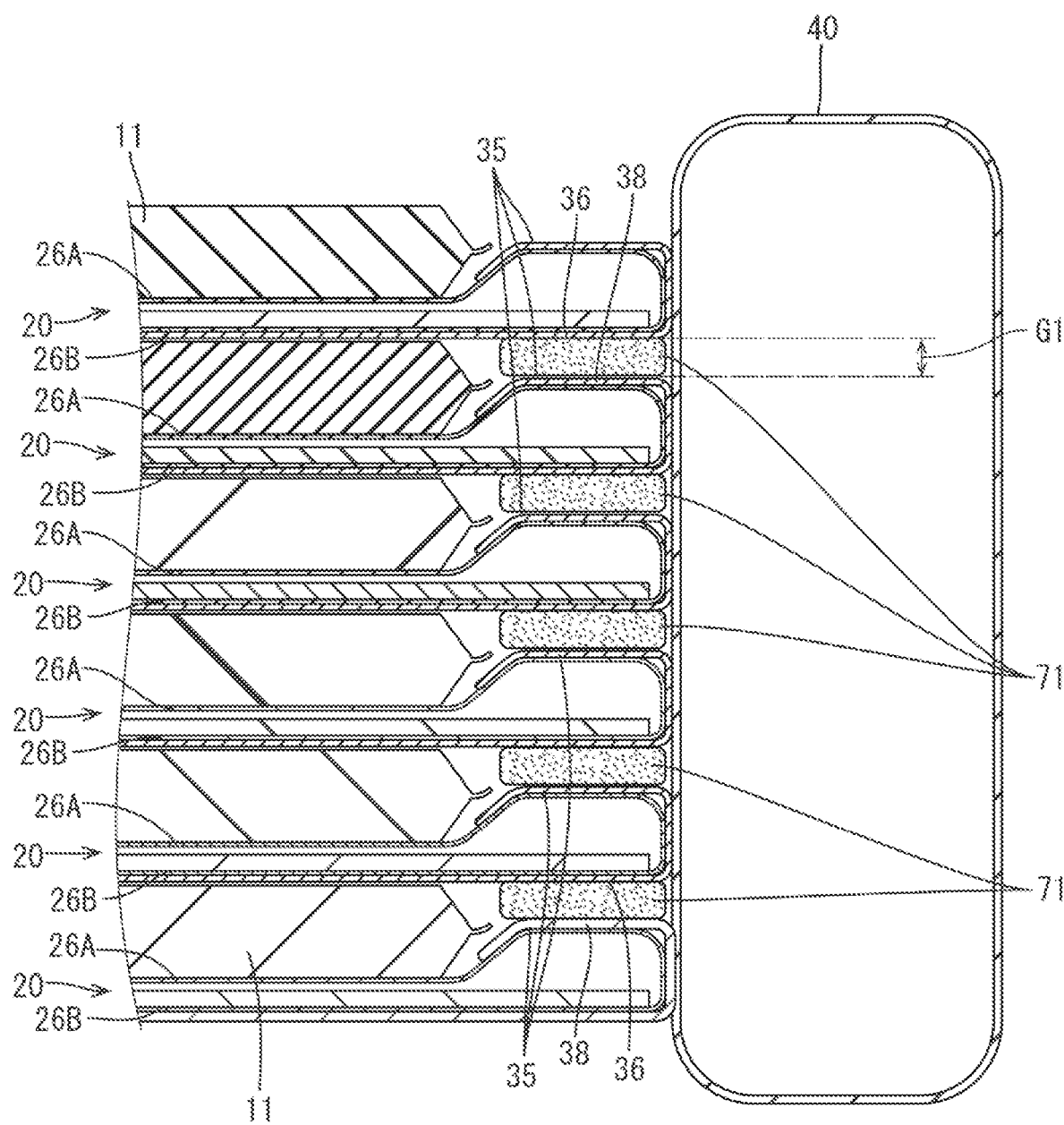
FIG. 22 is a partially enlarged cross-sectional view of FIG. 21.

Next, a third embodiment will be described with reference to FIGS. 15 to 18. In the second embodiment, the folded portion 52 of the heat transfer plate 51 is in abutment with the upper surface side of the bulging portion 28 of the cooling members 20 in the lower stage of the cooling member 20 placed on the heat transfer plate 51. In a power storage module 60 in the third embodiment, as illustrated in FIG. 18, a folded portion 63 of a heat transfer plate 61 is shaped to store a bulging portion 28 of a cooling member 20 on the lower side of the cooling member 20 placed on the heat transfer plate 61. Hereinafter, the identical components to those in the foregoing embodiments will be given the identical reference signs to those in the foregoing embodiments and descriptions thereof will be omitted.

Each of the heat transfer plates 61 includes: a contact portion 31 that is stacked on power storage element 11; a folded portion 63 that is folded such that the bulging portion 28 can be inserted; and a coupling portion 62 that couples the contact portion 31 and the folded portion 63 in an inclined direction.

The folded portion 63 includes: a heat transfer extension portion 64 that extends in parallel to the contact portion 31; an end wall 65 that extends in a direction orthogonal to the plate surface of the heat transfer extension portion 64; and a return portion 66 that extends from a lower end of the end wall 65 in a direction parallel to the contact portion 31. The height of the end wall 65 is set such that the bulging portion 28 is stored between the heat transfer extension portion 64 connected to the end wall 65 and the return portion 66 and is in contact with the inner surface of the folded portion 63. There is formed a gap between the return portion 66 of the heat transfer plate 61 and the heat transfer extension portion 64 of the heat transfer plate 61 on the side one stage lower.

The heat transfer plate 61 forms a storage space in the folded portion 63 that can store the bulging portion 28 of the sealing body 25. The folded portion 63 is shaped such that the bulging portion 28 abuts with the inner surface of the folded portion 63. Preferably, the folded portion 63 is shaped such that the outer surface of the bulging portion 28 closely adheres to a wide area of the inner surface of the folded portion 63. Heat transfer plates 67 and 68 different in shape from the heat transfer plates 61 are used at the top stage and the bottom stage of the power storage module 60.

Fourth Embodiment

Next, a fourth embodiment will be described with reference to FIGS. 19 to 22. In a power storage module 70 in a fourth embodiment, the power storage module W in the first embodiment is provided with a spacer 71 in a gap G1 between a return portion 38 of a heat transfer plate 30 and a heat transfer extension portion 36 of a heat transfer plate 30 on the upper stage side (adjacent) of the former heat transfer plate 30. Hereinafter, the identical components to those in the foregoing embodiments will be given the identical reference signs to those in the foregoing embodiments and descriptions thereof will be omitted.

The spacer 71 has a rectangular parallelepiped shape, for example, and is in contact with both the return portion 38 of the heat transfer plate 30 and the heat transfer extension portion 36 of the heat transfer plate 30 on the upper stage side (adjacent) of the heat transfer plate 30. Heat transfer between the adjacent heat transfer plates 30 is allowed via the spacer 71. The spacer 71 is at least higher in heat conductivity than air. In the present embodiment, the spacer 71 is formed from a sponge made of an elastically deformable synthetic resin or the like. However, the spacer 71 is not limited to this but may be formed from any of various members made of rubber, metal, and others, for example.

The spacer 71 can be fixed to the return portion 38 and the heat transfer extension portion 36 of the heat transfer plate 30 by an adhesive or the like, for example.

According to the fourth embodiment, the power storage module 70 includes the plurality of cooling members 20, the plurality of power storage elements 11, and the plurality of heat transfer plates 30. The plurality of heat transfer plates 30 have adjacent folded portions 35 disposed with a space therebetween. The power storage module 70 further includes the spacer 71 sandwiched between the adjacent folded portions 35 in the plurality of heat transfer plates 30.

This facilitates movement of heat between the heat transfer plates 30 adjacent to each other via the spacer 71, which makes it possible to dissipate heat from the power storage elements 11 via the heat transfer plates 30 and the spacers 71, thereby achieving improvement in heat transfer property.

Other Embodiment

The technique described herein is not limited to the embodiments described above and illustrated in the drawings. For example, the following embodiments are included in the scope of the technique described herein:

(1) The folded portions 35, 52 are provided with the bent portions 39, 55 at the leading end. However, the bent portions 39, 55 may not be provided.

(2) The numbers of the cooling members 20, the power storage elements 11, and the heat transfer plates 30, 51, 61 are not limited to the numbers in the foregoing embodiments but can be changed as appropriate.

(3) The heat dissipation member 40 may not be included. For example, the power storage module 10 may be covered with a metallic or synthetic resin case not illustrated, so that the heat of the power storage module 10 is dissipated via the case to the outside. In addition, the case may be a part of the heat dissipation member 40 or the case may cover the entire power storage module 10 including the heat dissipation member 40, for example. In this case, for example, the case may sandwich the power storage module 10 from the upper and lower sides to hold the power storage module 10.

EXPLANATION OF SYMBOLS 10, 50, 60, 70: Power storage module
11: Power storage element
20: Cooling member
21: Coolant
22: Absorption member
25: Sealing body
28: Bulging portion
30, 51, 61: Heat transfer plate
35, 52, 63: Folded portion
39: Bent portion
40: Heat dissipation member
71: Spacer
G1: Gap
S: Storage space

The invention claimed is:

1. A power storage module comprising:
   a cooling member that has a coolant and a sealing body hermetically sealing the coolant;
   a power storage element that is stacked on the cooling member; and
   a heat transfer plate that is stacked on the power storage element with the cooling member therebetween, wherein
   the sealing body is configured to form a bulging portion deformed by evaporation of the coolant in the sealing body, wherein the bulging portion is provided in a region of the sealing body not overlapping the power storage element, and
   the heat transfer plate has a folded portion with which the bulging portion is configured to abut.

2. The power storage module according to claim 1, wherein a front end side of the folded portion has a bent portion that is bent toward the bulging portion.

3. The power storage module according to claim 1, wherein the bulging portion is disposed inside the folded portion.

4. The power storage module according to claim 1, comprising:
   a plurality of the cooling members;
   a plurality of the power storage elements; and
   a plurality of the heat transfer plates, wherein
   a plurality of the folded portions provided in each of the plurality of heat transfer plates are disposed with a space therebetween, and
   the bulging portion is sandwiched between the folded portions.

5. The power storage module according to claim 1, comprising:
   the plurality of cooling members;
   the plurality of power storage elements; and
   the plurality of heat transfer plates, wherein
   a plurality of the folded portions provided in each of the plurality of heat transfer plates are disposed with a space therebetween, and
   the plurality of heat transfer plates include a spacer sandwiched between the folded portions in the plurality of heat transfer plates.

6. The power storage module according to claim 1, wherein the cooling member includes an absorption member that is disposed in the sealing body to absorb the coolant.

* * * * *